(12) United States Patent
Curtis et al.

(10) Patent No.: US 11,926,197 B2
(45) Date of Patent: Mar. 12, 2024

(54) DOOR ASSEMBLY FOR A MOTOR VEHICLE

(71) Applicant: Ford Global Technologies, LLC, Dearborn, MI (US)

(72) Inventors: Christopher Curtis, Leverkusen (DE); Emrah Tokyuerek, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 515 days.

(21) Appl. No.: 17/165,003

(22) Filed: Feb. 2, 2021

(65) Prior Publication Data
US 2021/0237542 A1 Aug. 5, 2021

(30) Foreign Application Priority Data
Feb. 3, 2020 (DE) .......................... 102020102612.9

(51) Int. Cl.
*B60J 5/04* (2006.01)
*B60R 21/04* (2006.01)

(52) U.S. Cl.
CPC ........... *B60J 5/0456* (2013.01); *B60J 5/0413* (2013.01); *B60J 5/0463* (2013.01); *B60J 5/0493* (2013.01); *B60R 21/0428* (2013.01)

(58) Field of Classification Search
CPC ...... B60J 5/0456; B60J 5/0413; B60J 5/0463; B60J 5/0493; B60R 21/0428; B60R 2021/0414; B60R 13/0243
See application file for complete search history.

(56) References Cited

U.S. PATENT DOCUMENTS

| 5,102,163 A | * | 4/1992 | Ishikawa | ................. B60R 7/046 296/187.05 |
| 5,306,066 A | * | 4/1994 | Saathoff | ................. B60J 5/0451 296/187.05 |
| 5,482,343 A | * | 1/1996 | Bradac | ................ B60R 13/0892 296/146.7 |
| 6,170,902 B1 | | 1/2001 | Sakuma et al. | |

(Continued)

FOREIGN PATENT DOCUMENTS

| DE | 4332166 A1 | 4/1994 |
| DE | 102005016646 A1 | 1/2006 |
| DE | 102005039813 A1 | 3/2007 |

OTHER PUBLICATIONS

DE Examination Report dated Feb. 4, 2020—Original Version and Computerized English Translation.

*Primary Examiner* — Justin B Rephann
(74) *Attorney, Agent, or Firm* — Frank A. MacKenzie; Bejin Bieneman PLC (57) ABSTRACT

A door assembly for a motor vehicle includes a door trim panel attached to a door body on the vehicle inside. The door trim panel includes a first impact region and a second impact region formed integrally therewith, wherein at each of the impact regions, an intermediate space is formed between the door trim panel and the door body. In order to allow an optimized protection of an occupant's pelvic region from injury by a vehicle door in a side impact, the door trim panel includes a channel portion, which is recessed back towards the door body, is formed between the impact regions and has two mutually opposite wall portions extending in the vehicle transverse direction, each of which is formed integrally with an impact region.

8 Claims, 5 Drawing Sheets

(56) References Cited

U.S. PATENT DOCUMENTS

| | | | | |
|---|---|---|---|---|
| 6,454,305 | B1* | 9/2002 | Prottengeier | B60R 21/04 |
| | | | | 280/805 |
| 6,679,967 | B1* | 1/2004 | Carroll, III | F16F 7/12 |
| | | | | 264/516 |
| 6,779,831 | B2 | 8/2004 | Moriyama | |
| 6,863,335 | B2* | 3/2005 | Lopez Torres | B60J 5/0455 |
| | | | | 296/146.7 |
| 7,410,204 | B2* | 8/2008 | Koa | B60J 5/0416 |
| | | | | 296/152 |
| 7,997,637 | B2 | 8/2011 | Suzuki et al. | |
| 9,266,489 | B2 | 2/2016 | Smith et al. | |
| 9,956,855 | B2* | 5/2018 | Tamaoki | B60J 5/0416 |
| 10,000,112 | B2 | 6/2018 | Patel et al. | |
| 10,788,091 | B2* | 9/2020 | Audi | B60R 21/04 |
| 2004/0135399 | A1* | 7/2004 | Torres | B60J 5/0455 |
| | | | | 296/203.03 |
| 2006/0265963 | A1* | 11/2006 | Winborn | B60J 5/0455 |
| | | | | 49/502 |
| 2007/0187961 | A1* | 8/2007 | Audi | B60R 21/04 |
| | | | | 293/134 |
| 2007/0220812 | A1* | 9/2007 | Valentage | B60J 5/0416 |
| | | | | 49/502 |
| 2007/0246925 | A1 | 10/2007 | Mani | |
| 2009/0278380 | A1 | 11/2009 | Bhattacharjee et al. | |
| 2009/0289470 | A1* | 11/2009 | Dix | B60R 21/0428 |
| | | | | 296/146.6 |
| 2015/0115585 | A1* | 4/2015 | Smith | B60R 21/0428 |
| | | | | 280/751 |
| 2016/0059678 | A1* | 3/2016 | Tamaoki | B60J 5/0455 |
| | | | | 49/501 |

* cited by examiner

DOOR ASSEMBLY FOR A MOTOR VEHICLE

CROSS-REFERENCE TO RELATED APPLICATION

This patent application claims priority to German Application No. DE 102020102612.9 filed on Feb. 3, 2020, which is hereby incorporated by reference in its entirety.

BACKGROUND

The disclosure relates to a door assembly for a motor vehicle.

A typical structure of a vehicle door has an outer panel and an inner panel which substantially define the outer form and mechanical stability of the door. These panels in assembled state are known as the "door carcase". On the inside of the inner panel, normally a door module is arranged which e.g. serves to cover openings in the inner panel and hold function elements such as electric window lifters, speakers, locking elements etc. For aesthetic reasons amongst others, the door module must be covered with a door inner trim panel on the sides facing the vehicle interior. The door inner trim panel may be attached to the inner panel or door module. This door trim panel usually consists of plastic, in some cases with a surface coating providing a pleasing appearance and feel, and may consist of one or more trim elements.

In a side impact, the door of a vehicle may be pushed in and thus collide with an occupant sitting on a vehicle seat. The collision firstly takes place with the door inner trim panel which forms the innermost part of the door. In a side impact, normally one and the same trim element collides with the lower thorax and pelvis of the occupant, and with the vehicle seat itself. Part of the seat, e.g. a frame of a seat lower part or backrest or an adjustment lever, may protrude laterally towards the outside relative to the occupant's pelvis.

In a side impact, the door inner trim panel is compressed by said seat components before it hits the occupants. Although, viewed from the side, a first region of the trim element collides with the seat component and a separate second region collides with the occupant, because of the stiffness of the trim element not only is the first region compressed but also at the same time the second region. Thus the second region is precompressed and when it hits the occupant, cannot be compressed or only slightly compressed further. This in particular concerns the region assigned to the occupant's pelvic region. The risk of injury is thereby significantly increased. To counter this problem, it would firstly be possible to reinforce the first region by stiffening elements e.g. ribs in order to prevent premature compression. However, this necessarily also leads to a stiffening of the second region, which adversely affects its crumple properties. Another possibility would be to make the two regions from separate trim elements with different stiffness, which however leads to more complex mounting, e.g. with respect to the precise mutual alignment of the two elements. Furthermore, active protection systems such as side airbags are known. These however lead to a significantly more complex structure. Usually, active systems also entail a higher weight or higher mass.

U.S. Pat. No. 10,000,112 B2 discloses a door assembly for a vehicle comprising a door panel and a door trim panel having a molded feature for energy absorption of a pelvic load path, which is arranged on a surface of the door trim panel facing the door panel. The feature may be defined from a pelvic load path with a plurality of stepped surfaces formed in a material of the door trim panel. In particular, the stepped surfaces may define a stepped cross-section, an arcuate stepped cross-section, a V-shaped stepped cross-section or a sloping stepped cross-section.

U.S. Pat. No. 9,266,489 B2 discloses an energy-absorbing module mounted on a door inner trim panel. This is constructed as a shell and has an end wall spaced from the door inner trim panel, and a plurality of side walls which extend from the end wall to the door inner trim panel and are connected thereto via a peripheral flange. Each of the side walls may include slots extending in the vehicle transverse direction. Also, openings may be formed at the transition from a side wall to the end wall. Ribs may be formed on a side of the end wall facing the door inner trim panel.

U.S. Pat. No. 7,997,637 B2 discloses an impact energy damper made of resin, which is provided for mounting on an outer face of a door trim panel. This has a cross-shaped rib comprising four ribs and a connecting portion, wherein the four ribs extend in a direction such that they cross the outer face of the door trim panel and are connected together in a single cross shape by the connecting portion. Furthermore, at least one outer wall is provided which is connected to at least one of the side edges of the rib in a T-shape, wherein the at least one outer wall has a contact area which can touch the outer face of the door trim panel. At least one support face is provided for securely fixing the cross-shaped rib to the outer face of the door trim panel via the at least one outer wall, wherein the at least one support face extends from the contact edge of the at least one outer wall and along the outer face of the door trim panel.

DE 10 2005 039 813 A1 shows a side door for a motor vehicle in which a door cavity is formed by a door carrier structure and a door inner trim panel facing an adjacent vehicle seat, wherein said cavity houses an impact element for influencing the impact of a seat occupant on the side door. The impact element is formed to be substantially deformationally rigid in an impact of the side door on a seat occupant. The impact element may be arranged in the rear lower region of the side door for cooperation with the occupant's pelvic region, and supported on the door carrier structure, in particular on a transverse web of the side door. The door inner trim panel may include an impact surface in the rear lower region of the side door, and the impact surface may be supported superficially on the impact element.

U.S. Pat. No. 6,170,902 B1 discloses a door trim panel for a vehicle door. A trim panel body has a first surface facing the interior of the vehicle, and a second surface facing the door inner panel. A flange is molded onto the edge of the trim panel body and connects the latter to the door inner panel. At least one rib connects a portion of the second surface and the flange. On an edge facing the door inner panel, the rib has an energy-concentrating structure which initiates a local crack in the door inner panel in a side impact, thereby absorbing energy. The at least one rib is formed on a rear end of the door trim panel above an armrest.

US 2007/0246925 A1 discloses an armrest assembly for a vehicle door which has an inner panel and an outer panel. The assembly extends inward from the inner panel. A compressible cell structure includes a flat material which forms a closed shape. A trim segment slopes upward and inward from the door inner trim panel, and an armrest support is formed at least partially by the trim segment. The compressible cell structure is configured to be pressed in when the door inner trim panel is pushed in towards the door inner panel.

U.S. Pat. No. 6,779,831 B2 describes a door structure for a vehicle in which an opening, formed in a side portion of a vehicle body and continuous in a direction from rear to front, is opened and closed by a front side door and a rear side door, and has a cover region where a rear end of the front side door and a front end of the rear side door overlap in the direction of the vehicle width, wherein a front impact protection bar extending from rear to front in the direction of the vehicle body is arranged in the front side door.

SUMMARY

The disclosure is based on the object of allowing optimized protection of an occupant's pelvic region from injury by a vehicle door in a side impact.

It should be noted that the features and measures specified individually in the following description can be combined with one another in any desired technically meaningful way and disclose further refinements of the disclosure. The description additionally characterizes and specifies the disclosure, in particular in conjunction with the figures.

The disclosure provides a door assembly for a motor vehicle. The motor vehicle may in particular be a car but also a truck. The door assembly is assigned to a vehicle door which closes the interior of the motor vehicle against the outside.

On the vehicle inside, the door assembly has a door trim panel attached to a door body. In this context, the term "door body" is used as a general term for the door carcase, including the inner panel and outer panel, and any provided door module. Such a door module is normally arranged on the inside of the inner panel and serves e.g. to cover openings in the inner panel and hold function elements such as electric window lifters, speakers, locking elements etc. The inner and outer panels usually are metal, although in this context the term "panel" should not be interpreted restrictively and a design made of fiber composite material would also be conceivable. In contrast, the door module is normally made of plastic, in some cases also fiber-reinforced plastic. The door inner trim panel is attached to the door body on the vehicle inside, i.e. on the side facing the vehicle interior when the door is closed. It may in particular be attached to the inner panel or door module. The door trim panel usually is plastic. It may also have a surface coating creating a pleasing appearance and feel. This surface coating may consist for example of leather, synthetic leather or fabric. The door trim panel may be made of one or more parts, i.e. in some cases it may consist of several trim elements. The type of fixing is not restricted in the context of the disclosure, wherein here normally releasable connecting means are used such as clips, i.e. clamps, snap connectors or screws.

The door trim panel has a first impact region, which could also be called a seat impact region and for example lies opposite a vehicle seat in the vehicle transverse direction, and a second impact region formed integrally therewith which lies e.g. opposite a pelvic region of an occupant and to this extent may be described as the pelvic impact region. These statements evidently relate to the operating state of the vehicle in which the door and vehicle seat are correctly installed, and with an occupant sitting on the vehicle seat. Here, a region of the door trim panel, designated the seat impact region, lies opposite the vehicle seat in the vehicle transverse direction (i.e. along the Y-axis). Directional data such as "in the vehicle transverse direction" with respect to the door assembly relate to the correctly installed and closed vehicle door. In particular, the seat impact region may lie opposite a frame of a seat lower part or seat backrest, or an adjustment element arranged on the side of the vehicle seat. If, in a side impact, the door is pushed inward in the vehicle transverse direction, the seat impact region collides with the vehicle seat. Another region, designated the pelvic impact region, lies opposite the occupant's pelvic region in the vehicle transverse direction. In a side impact therefore, this region collides with the occupant's pelvic region. The seat impact region is formed integrally or as one piece with the pelvic impact region, i.e. insofar as the door trim panel is composed of several trim elements, the seat impact region and pelvic impact region are parts of one and the same trim element. The vehicle seat may be the driver's seat, the front passenger's seat or a rear seat or rear bench seat. Accordingly, the vehicle door may be the driver's door, the front passenger's door or one of the rear doors. Naturally, the respective terms "seat impact region" and "pelvic impact region" are not restrictive. In principle, the object of the disclosure is to protect occupants so that injuries to occupants over the entire body region can be avoided.

At each of the impact regions, an intermediate space is formed between the door trim panel and the door body. In other words, the door trim panel does not rest (completely) on the door body with the impact regions, but is spaced therefrom at least in regions. Thus, an intermediate space is formed between the door trim panel and the door body in the vehicle transverse direction. This naturally refers to the undamaged and undeformed state of the door. Preferably, as a cavity, the intermediate space is at least largely empty or air-filled, although it is possible that various elements, e.g. cables for components attached to the door module, are arranged at least partially inside the intermediate space. Because of the distance or intermediate space, each of the impact regions may in principle serve as a crumple element or energy-absorbing element. A particularly important function of the pelvic impact region which collides with the occupant is that, by suitable deformation, it can decisively contribute to limiting the maximum force acting on the occupant. In other words, it can yield on collision with the occupant. In contrast, the door inner panel is typically so stable that it does not yield significantly and behaves as a solid rigid body against the occupant's body.

According to the disclosure, a channel portion, which is recessed back towards the door body, is formed between the impact regions and has two mutually opposite wall portions extending in the vehicle transverse direction, each of which is formed integrally with an impact region. The channel portion as a whole can be described as channel-like or trench-like. Whereas the two impact regions normally have a similar or identical distance from the door body at the point where they are mutually adjacent, the channel portion is recessed back in the direction of the door body. In other words, the profile of the door trim panel runs towards the door body in the channel section. If we consider the door trim panel from an A side facing the vehicle interior, the channel portion could be described as a depression. Normally, the channel portion is configured elongate, i.e. its extent in a course direction corresponds to a multiple (e.g. at least five times, at least ten times or at least twenty times) its extent transversely to the course direction. The course direction, which effectively corresponds to a border line between the pelvic impact region and the seat impact region, may differ locally, i.e. the corresponding border line in general need not be continuously straight. The channel portion has two opposing wall portions extending in the vehicle transverse direction, each of which is formed integrally with an impact region. In other words, a first wall portion is formed integrally with the seat impact region, while a second wall portion opposite this is formed integrally with the pelvic impact region. The wall portions effectively form the "side walls" of the channel portion. Starting from the respective impact region, they each extend in the vehicle transverse direction but do not necessarily run parallel to the vehicle transverse direction. Insofar as the door trim panel is spaced from the door body in the vehicle transverse direction, the wall portions run towards the door body. Each of the wall portions also extends along the course direction of the channel portion, normally along its entire length. The wall portions may be directly connected together, but it is also possible that they are only indirectly connected together via the connection of the impact regions. At the transition from an impact region to its assigned wall portion, the door trim panel may have an arcuate or rounded profile, so as to avoid sharp edges which could possibly constitute a risk of injury to occupants in a side impact.

Despite an integral connection of the seat impact region with the pelvic impact region, the channel portion nonetheless to a certain extent achieves a structural division of the door trim panel, wherein in particular the force transfer from the seat impact region to the pelvic impact region can be significantly reduced. If the vehicle door is pushed inward in a side impact, the seat impact region collides with the vehicle seat and a force is applied to the seat impact region in the vehicle transverse direction. With corresponding intensity, this leads to a deformation of the seat impact region. Because of the integral design of the seat impact region with the pelvic impact region, necessarily forces within the material of the door trim panel are also transmitted to the pelvic impact region. Without the channel portion, the pressing-in of the seat impact region would lead directly to a pressing-in of the pelvic impact region, even if this has no direct contact with the occupant's pelvic region. The channel portion however means that forces acting in particular in the vehicle transverse direction are not transmitted directly. Such a transmission would however still be possible via the interposed wall portions. This indirect transmission already allows a reduction in the effects on the pelvic impact region. It is also possible that the wall portions deform in themselves or change their orientation with respect to the impact regions, i.e. the connection between the seat impact region and the pelvic impact region may be characterized as flexible. As a whole, despite an integral and hence economic production, an at least partial decoupling of the deformation of the pelvic impact region from the deformation of the seat impact region is achieved. This in turn prevents an early compression of the impact pelvic region towards the door body, so that when it does hit the occupant's pelvic region, the pelvic impact region may still yield, whereby the maximum forces acting on the occupant can be limited.

According to an advantageous embodiment, an extent of each wall portion in the vehicle transverse direction corresponds to at least 70% of an extent of the intermediate space adjacent to the wall portion. In other words, if we consider the intermediate space between the door trim panel and the door body adjacent to or next to the respective wall portion, a first extent can be assigned thereto in the vehicle transverse direction. In other words, this is the distance between the door trim panel and the door body next to the wall portion. In contrast, the wall portion has a second extent in the vehicle transverse direction which could be described as the extent of the wall portion in the direction of the door body. In this embodiment, the second extent is at least 70% of the first extent. This value may also amount to at least 80% or at least 90%. It is also possible that this value is 100%, so that the wall portion lies against the door body and optionally may even be pretensioned against the door body. In the embodiment shown here, the wall portions are configured to rest on the door body either from the start or after deformation of the door trim panel because of the force exerted in the vehicle transverse direction, whereby a force transmission from the seat impact region to the pelvic impact region is largely suppressed. It is particularly important that the pelvic impact region can rest on the door body via its assigned second wall portion.

In general, the decoupling of the two impact regions can be achieved well with a comparatively narrow but deep channel portion. According to a corresponding embodiment, the wall portions run at an angle of less than 30° to each other. They may also run at an angle of less than 20° to each other. In extreme cases, they could even run parallel to each other. The cross-section of the channel portion in this embodiment could be roughly described as V-shaped, wherein the opening angle of the V is maximum 30°. In general, the angle need also not be constant, i.e. in relation to the cross-section (transversely to the course direction of the channel portion), the wall portions need not be configured straight but may also be curved or angled at least in portions. In general however, a straight design is sufficient. Also, a horizontal floor portion may be arranged between the two wall portions, wherein the wall portions extend away from this at an angle. The V-shaped wall portions deform in different directions, effectively bulging out and not buckling, which avoids a blockade, i.e. contact, of the wall portions against each other.

Preferably, the channel portion has a lower portion extending towards the rear in the vehicle longitudinal direction, and optionally a rear portion extending upward therefrom. These statements describe the above-mentioned course direction of the channel portion. The rear portion may also be omitted. The lower portion delimits the second impact region, i.e. for example the pelvic impact region, towards the bottom while the rear portion delimits the pelvic impact region towards the rear. The lower portion runs towards the rear in the vehicle longitudinal direction, wherein however in general it need not run parallel to the vehicle longitudinal axis but may slope with respect to this. The slope may e.g. be adapted to a slope of the seat surface of the vehicle seat. The optional rear portion adjoins the lower portion and runs upward, but normally not parallel to the vertical axis of the vehicle. Usually, the rear portion slopes with respect to the vertical axis, which may for example correspond to the slope of a backrest of the vehicle seat. The transition from the lower portion to the rear portion may be defined more or less clearly, for example giving a curved or angled line course at the transition.

Each of the wall portions may be closed in itself. With respect to the behaviour of the channel portion and the adjacent impact regions in a side impact, it has however often proved advantageous if at least one passage opening is formed in the channel portion. Here, a "passage opening" designates an opening which passes through the wall of the door trim panel, in contrast to a blind recess. The passage opening may be molded in during forming of the door trim panel, or it may be introduced later by suitable processes such as milling, cutting, laser cutting or similar. Such a passage opening evidently influences the mechanical stability or structural properties of the channel portion. The mechanical coupling of the regions of the door trim panel adjoining the passage opening is weakened, leading overall to easier deformability. It is also possible to influence the movement of individual portions by a special geometry and arrangement of the passage opening, since such movement results from the action of force following a side impact. In other words, the deformation can be influenced with respect to progress and dynamics.

Here, at least one passage opening may be formed as a wall slot extending in the vehicle transverse direction within a wall portion or between the wall portions. The walls slot extends in the vehicle transverse direction, or in other words in the direction towards the door body. It is elongate in the vehicle transverse direction, i.e. its cross-section in the vehicle transverse direction is greater than transversely thereto. In particular, it may extend along the entire extent of the wall portion in the vehicle transverse direction. The respective wall slot may be arranged either within a wall portion, i.e. it may divide the wall portion, which primarily affects the structural strength of this wall portion, or it may be formed between the wall portions, i.e. separate the two wall portions from each other, which in particular causes the two wall portions to be deformable independently of each other to a greater extent.

In particular, at least one wall slot may be formed in a transitional region between the lower portion and the rear portion. This is achieved above all in that the part of the wall slot assigned to the lower portion is deformable to a greater extent independently of the part assigned to the rear portion. In particular on an angled transition from the lower portion to the rear portion, the connection of the two portions may lead to a stiffening of the structure of the channel portion which could be counter-productive under certain circumstances. This may be alleviated if the respective wall portion is interrupted by at least one wall slot. It is also possible to provide a plurality of wall slots in the transitional region.

Furthermore, at least one wall slot may be formed at the end of the channel portion. Such a wall slot may be formed in an end region of the wall portion. Alternatively or additionally, the wall slot may be formed between the two wall portions and separate these from each other.

Furthermore, at least one floor slot may be formed between the wall portions towards the door body. The floor slot is effectively formed at the end of the wall portion facing the door body. At this end, a floor portion may be formed between the wall portions. In particular, the floor slot may extend along the entire length of the channel portion. This floor slot may transform into a wall slot formed at the end of the channel portion. The floor slot (in some cases, in addition to a wall slot provided on the end) decouples the two wall portions from each other, which in turn leads to a greater decoupling of the seat impact region from the pelvic impact region.

Because of the structure of the channel portion, an opening is formed towards the vehicle interior which effectively opens in the region between the opposing wall portions. Depending on various factors, in particular the desired aesthetics of the door trim panel, it may be acceptable for this opening to be visible from the vehicle interior. If this is not the case, according to one embodiment, the channel portion (and hence the corresponding opening) may be covered towards the vehicle interior by a cover element. The cover element is preferably connected to the door trim panel, e.g. to one of the impact regions or one of the wall portions. It is however preferred if the cover element is connected to the door trim panel (e.g. to the pelvic impact region) only on one side of the channel portion, while it merely rests loosely on the other side of the channel portion (e.g. on the seat impact region). A connection on both sides would counter the desired decoupling of the two impact regions.

BRIEF DESCRIPTION OF THE DRAWINGS

Further advantageous details and effects of the disclosure will be explained in more detail below on the basis of various exemplary embodiments illustrated in the figures. In the drawing.

In the different figures, identical parts are always provided with the same reference signs, for which reason these parts are generally also described only once.

DETAILED DESCRIPTION

Figure 1:
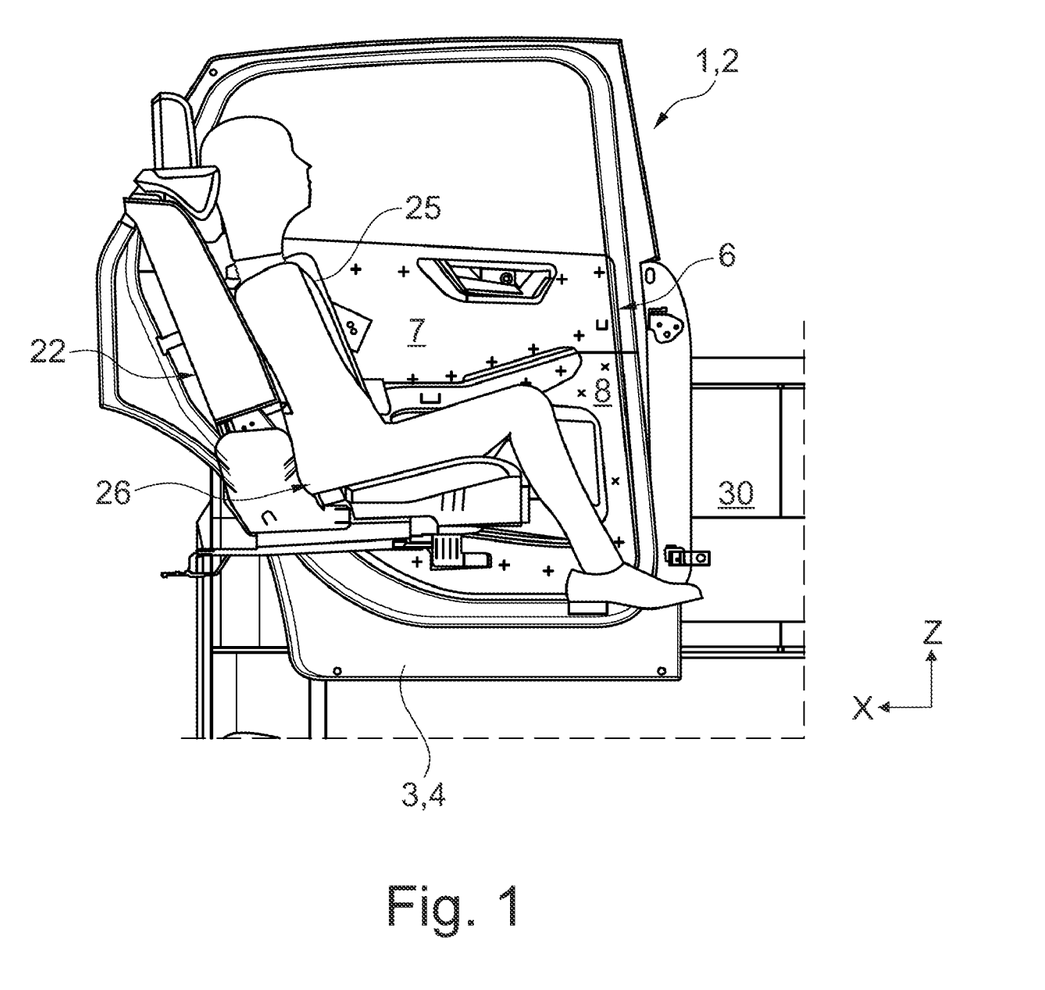
FIG. 1 shows a side view of a vehicle seat with an occupant, and a vehicle door with a door assembly according to the disclosure, in a side impact.
Figure 2:
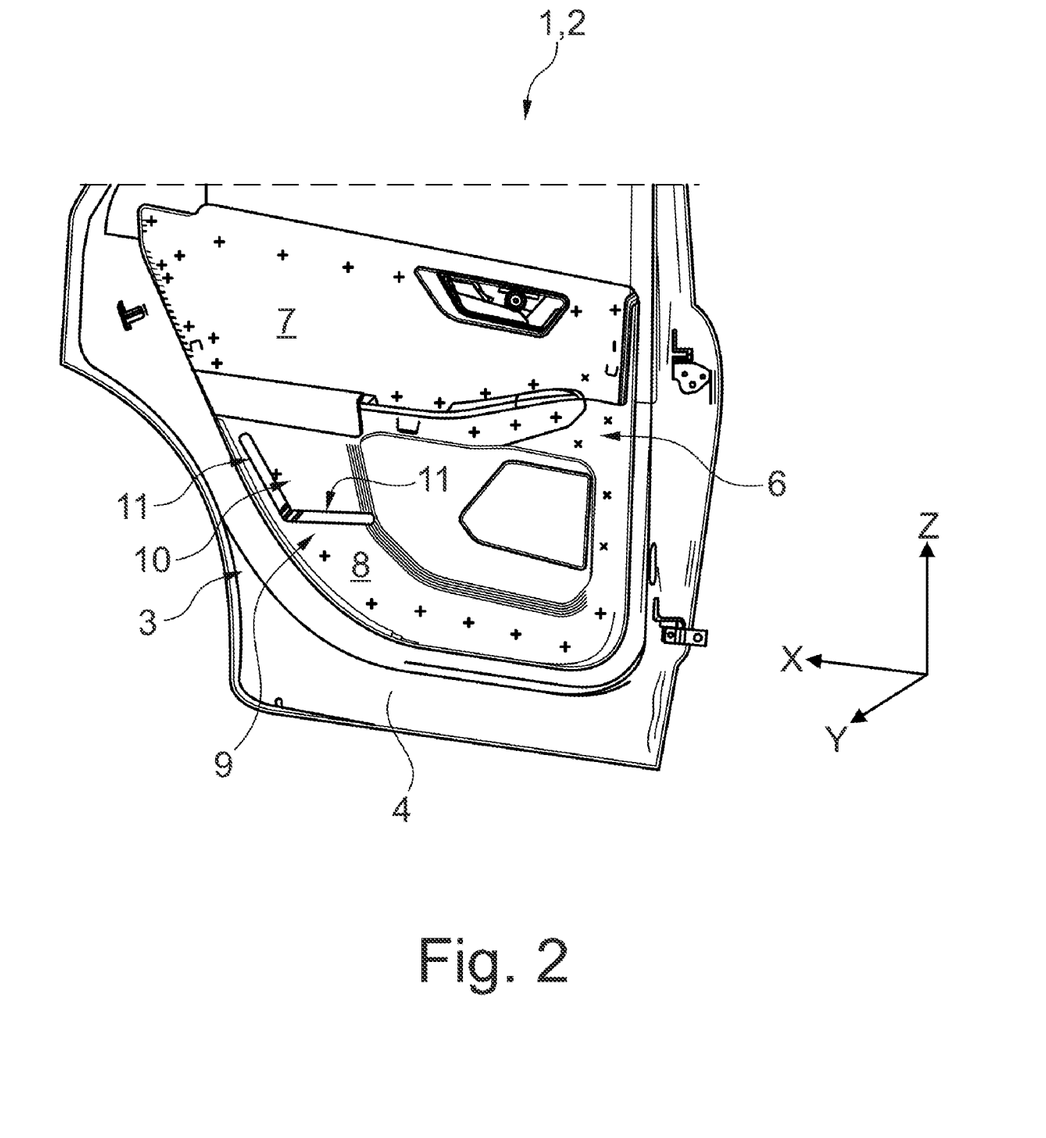
FIG. 2 shows a perspective illustration of the vehicle door from FIG. 1.

FIG. 1 shows a side view of a vehicle door 1 with a door assembly 2 according to the disclosure, and a vehicle seat 22 with an occupant 25 seated thereon, here depicted schematically as a dummy. The vehicle door 1 and the seat 22 are parts of a car, the remaining components of which have been omitted here for reasons of clarity. FIG. 1 shows a typical situation during a side impact in which another motor vehicle 30 (or a barrier) hits the vehicle door 1 from the side and deforms this in the direction of the vehicle seat 22 with the occupant 25. The vehicle door 1 has a door body 3 with an inner panel 4 and an outer panel 5. On the inside, a door trim panel 6, which in this case is composed of a first trim element 7 and a second trim element 8, is attached to the inner panel 4. Whereas the door body 3 is made of sheet metal, the trim elements 7, 8 are made of plastic. These each have a structure which could be described as thin-walled and shell-like.

The precise structure of the door trim panel 6 or second trim element 8 is now explained with reference to FIGS. 2 to 5.

Inside the second trim element 8, a first impact region 9 may be defined which for example lies opposite the vehicle seat 22 in the vehicle transverse direction (i.e. along the Y-axis). The first impact region 9 is referred to below as the seat impact region 9. In a side impact, the seat impact region 9 accordingly collides exclusively or mainly with the vehicle seat 22. Furthermore, a second impact region 10 may be defined. The second impact region 10 is referred to below as the pelvic impact region 10, which lies opposite a pelvic region 26 of the occupant 25 in the direction of the Y-axis. Accordingly, in a side impact, it collides mainly or exclusively with the pelvic region 26. As evident in particular from FIG. 4, in the vehicle transverse direction, in each of the impact regions 9, 10, an intermediate space is provided between the door trim panel 6 (more precisely, the second trim element 8) and the door body 3 (more precisely, the inner panel 4). Because of the intermediate space and the generally comparatively easy deformability of the plastic material from which the door trim panel 6 is made, each impact region 9, 10 can yield or be pushed in during a side impact. With respect to the pelvic impact region 10, this means that the maximum forces acting on the pelvic region 26 can be limited in order to prevent injury to the occupant 25.

During a side impact however, the seat impact region 9 collides with hard parts of the vehicle seat 22 before the pelvic impact region 10 collides with the pelvic region 26. In other words, compression within the seat impact region 9 begins before the pelvic impact region 10 comes into contact with the occupant 25. To prevent the precompression from propagating decisively to the pelvic impact region 10, a channel portion 11, which can be molded in during forming of the second trim element 8, is formed between the seat impact region 9 and the pelvic impact region 10. As evident in particular from FIGS. 3 and 4, the channel portion 11 has a first wall portion 12 adjoining the seat impact region 9, and a second wall portion 13 adjoining the pelvic impact region 10. The two impact regions 9, 10 and the channel portion 11 are formed integrally with each other as parts of the second trim element.

The channel portion 11 can be divided roughly into a lower portion 11.1 and an optional rear portion 11.2. The rear portion 11.2 may however also be omitted. The lower portion 11.1 runs towards the rear along the X axis, wherein it slopes slightly downward. This course corresponds approximately to the upper contour of the seat surface of the vehicle seat 22. The rear portion 11.2 adjoins the lower portion 11.1 and is angled relative thereto, i.e. it runs obliquely upward. Its course corresponds approximately to the front contour of the backrest of the vehicle seat 22. Each of the above-mentioned wall portions 12, 13 extends both along the lower portion 11.1 and also along the rear portion 11.2. The two wall portions 12, 13 run in the direction of the door body 3 (or the inner panel 4) in the vehicle transverse direction. However, neither of the wall portions 12, 13 runs parallel to the Y-axis, but the two slope relative to each other in a V-shape and in this example run at an angle of around 10° to each other.

The extent of the wall portions 12, 13 along the Y-axis in the present case corresponds to approximately 90% of the distance between the second trim element 8 and the inner panel 4, in each case with respect to a location directly adjacent to the respective wall portion 12, 13. In other words, in this example the wall portions 12, 13 do not touch the inner panel 4 as long as the door assembly 2 is not deformed. At the end facing the inner panel 4, the wall portions 12, 13 transform into a floor portion 17 This is however not closed but includes a continuous floor slot 18 which thus separates the two wall portions 12, 13 from each other. At the end of the lower portion 11.1, the floor slot 18 transforms into a first wall slot 14 which belongs to a group of a total of three first wall slots 14. At the end of the rear portion 11.2, a group of second wall slots 15 is formed, one of which transforms into the floor slot 18.

The described separation largely decouples the two wall portions 12, 13 from each other, which again leads to an at least extensive decoupling of the two impact regions 9, 10. In other words, a deformation of the seat impact region 9 has no effect or only a slight effect on a deformation of the pelvic impact region 10. A decisive function of the wall portions 12, 13 is to interrupt or at least reduce the force flow between the seat impact region 9 and the pelvic impact region 10. Another function is to divert any forces acting on the respective impact regions 9, 10 in the direction of the inner panel 4. We could also say that, for example, the pelvic impact region 10 can rest on the inner panel 4 via the second wall portion 13, which counters a premature deformation of the pelvic impact region 10. On the other hand, in particular the angled structure of the channel portion 11 with the lower portion 11.1 and rear portion 11.2 could provide stiffening, which hinders the intended deformation of the pelvic impact region 10. To avoid this, firstly the first and second wall slots 14, 15 described above are provided, and also a group of third wall slots 16 in the transitional region between the lower portion 11.1 and the rear portion 11.2. As a whole, a function of the wall slots 14, 15, 16 is to reduce the stiffness of the channel portion 11 locally in a targeted fashion, in order to set its deformation behaviour in a side impact in the proposed manner.

Figure 3:
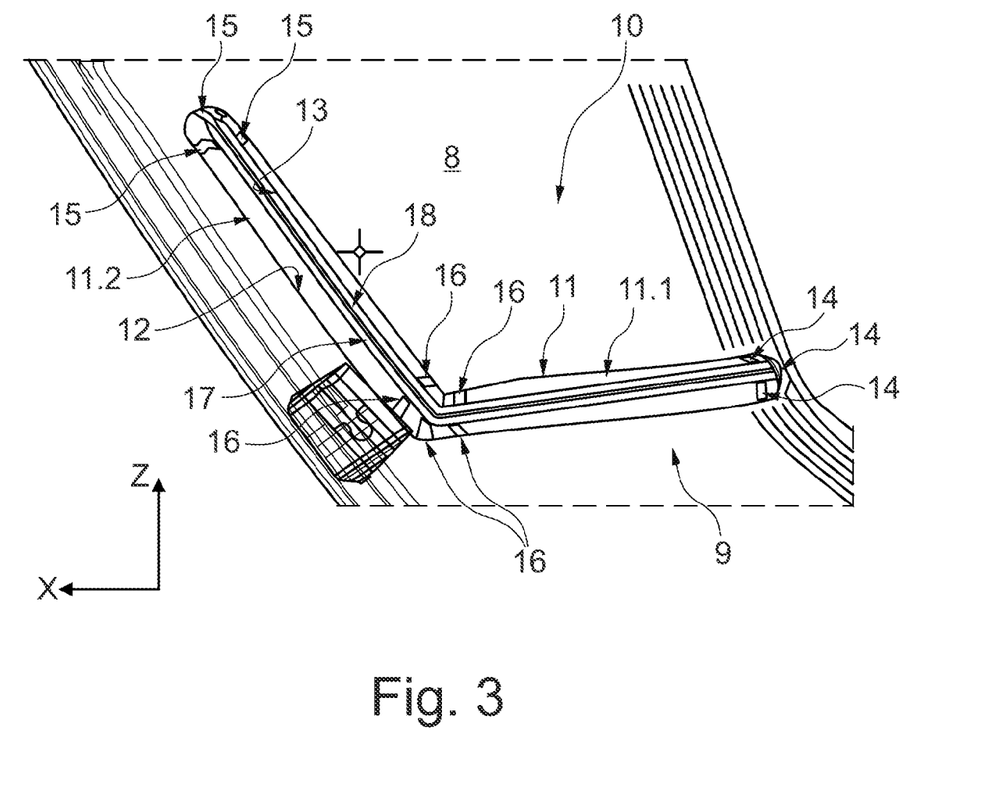
FIG. 3 shows a detail illustration of a trim element of the door assembly from FIG. 2.
Figure 4:
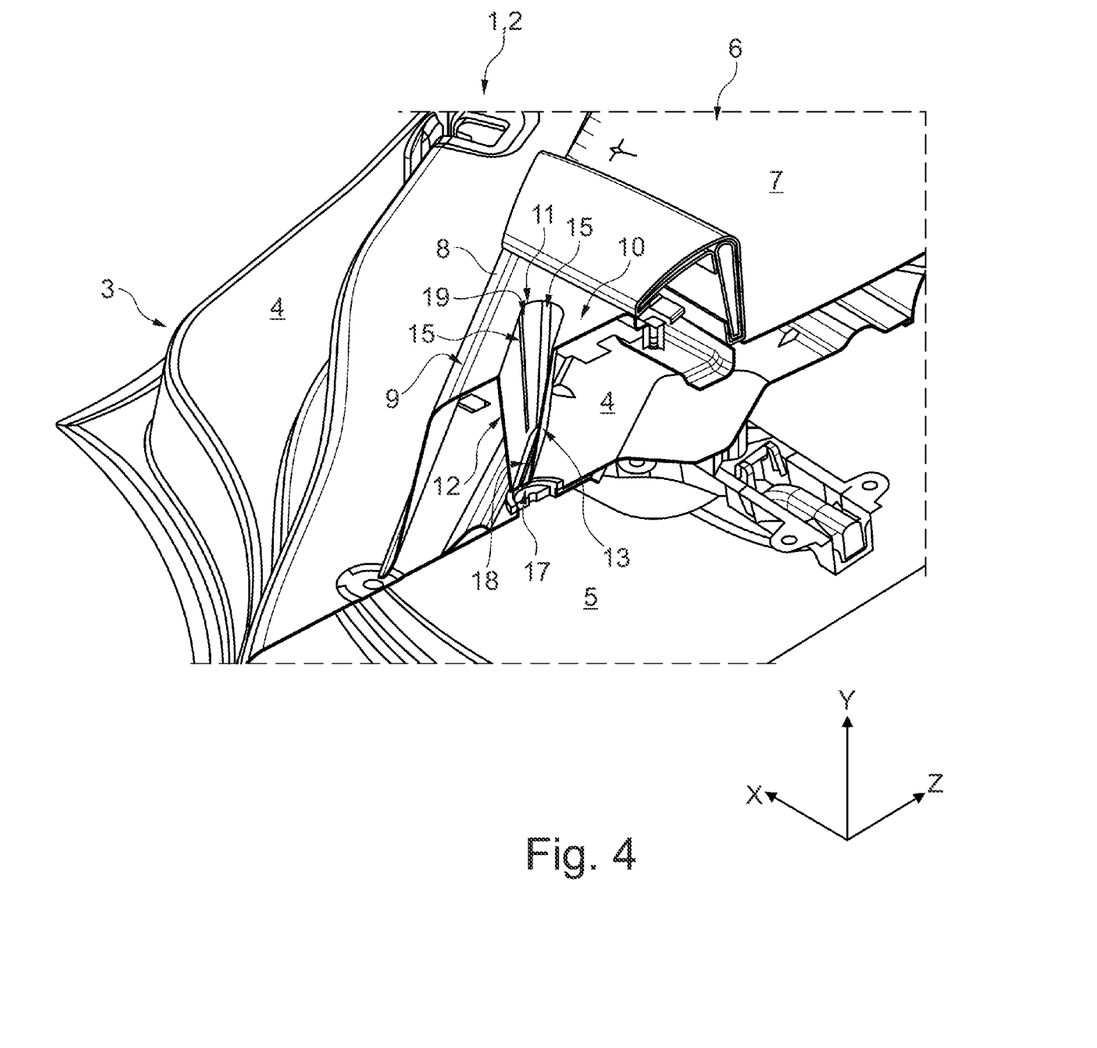
FIG. 4 shows a perspective cross-sectional illustration of part of the vehicle door from FIG. 1.
Figure 5:
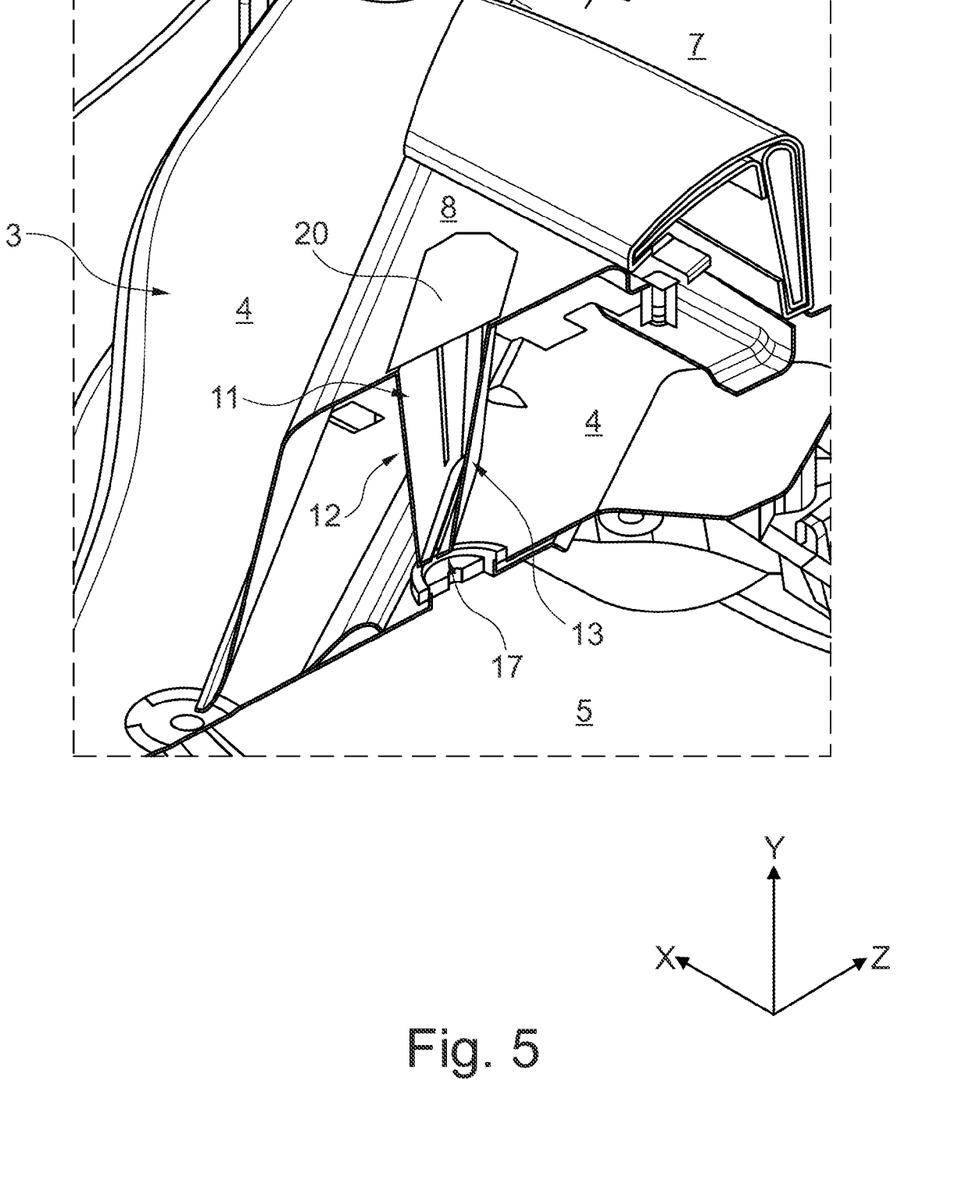
FIG. 5 shows a detail view of FIG. 4.

Under certain circumstances, the presence of the channel portion 11 could detract from the aesthetic impression of the door trim panel 6. For this reason, a cover element 20 (shown in FIG. 5) may be provided, which covers the opening 19 of the channel portion 11 towards the vehicle interior. In FIGS. 3 and 4, the cover element 20 has been omitted for reasons of clarity. Since it has the technical function of not hindering the design and purpose of the channel portion, it may be designed to be very lightweight with material saving, and may also consist of plastic. It is conceivable to mold the cover element directly onto the second trim element 8, but in general this is complex in relation to production. Alternatively, the cover element 20 could be pre-produced separately and then connected to the trim element 8. The corresponding connection could be created for example by means of clips or by bonding or ultrasound welding. In order not to hinder the described decoupling of the pelvic impact region 10 from the seat impact region 9, the cover element 20 is normally connected to the second trim element 8 only on the side of one of the impact regions 9, 10, whereas for example it only rests loosely on the side of the other impact region 9, 10.

LIST OF REFERENCE SIGNS

1 Vehicle door
2 Door assembly
3 Door body
4 Inner panel
5 Outer panel
6 Door trim panel
7, 8 Trim element
9 Seat impact region
10 Pelvic impact region
11 Channel portion
11.1 Lower portion
11.2 Rear portion
12, 13 Wall portion
14, 15, 16 Wall slot
17 Floor portion
18 Floor slot
19 Opening
20 Cover element
22 Vehicle seat
25 Occupant
26 Pelvic region
30 Motor vehicle
X X axis
Y Y axis
Z Z axis

The invention claimed is:
1. A door assembly comprising:
a door body; and
a door trim panel attached to the door body;
the door trim panel having a first impact region and a second impact region;

at each of the impact regions, an intermediate space is formed between the door trim panel and the door body;

the door trim panel includes a channel portion recessed towards the door body between the first impact region and the second impact region, the channel portion having two mutually opposite wall portions extending in a vehicle transverse direction, one of the wall portions being integrally formed with the first impact region and the other of the wall portions being integrally formed with the second impact region; and the door trim panel including a floor at which the wall portions terminate, the door trim panel including a slot through the floor between the wall portions.

2. The door assembly as set forth in claim 1, wherein the slot through the floor extends through one of the wall portions.

3. The door assembly as set forth in claim 1, wherein the channel portion includes a lower portion that is elongated and a rear portion elongated transversely from the lower portion.

4. The door assembly as set forth in claim 3, wherein the slot extends along both the lower portion and the rear portion.

5. The door assembly as set forth in claim 4, wherein the slot through the floor extends through wall portions of the lower portion and the rear portion.

6. The door assembly as set forth in claim 3, wherein the lower portion and the rear portion are co-planar.

7. The door assembly according to claim 1, wherein an extent of each wall portion in the vehicle transverse direction corresponds to at least 70% of an extent of the intermediate space adjacent to the respective wall portion.

8. The door assembly according to claim 1, wherein the wall portions run at an angle of less than 30° to each other.

* * * * *